US010947675B2

(12) United States Patent
MacDonald

(10) Patent No.: US 10,947,675 B2
(45) Date of Patent: Mar. 16, 2021

(54) ARTICLE OF COMMERCE TREATED WITH SUBLIMABLE MATERIAL

(71) Applicant: KIMBERLY-CLARK WORLDWIDE, INC., Neenah, WI (US)

(72) Inventor: John Gavin MacDonald, Decatur, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 176 days.

(21) Appl. No.: 15/751,365

(22) PCT Filed: Aug. 29, 2016

(86) PCT No.: PCT/US2016/049202
§ 371 (c)(1),
(2) Date: Feb. 8, 2018

(87) PCT Pub. No.: WO2017/040372
PCT Pub. Date: Mar. 9, 2017

(65) Prior Publication Data
US 2018/0237995 A1    Aug. 23, 2018

Related U.S. Application Data

(60) Provisional application No. 62/211,952, filed on Aug. 31, 2015.

(51) Int. Cl.
| | |
|---|---|
| *D21H 27/00* | (2006.01) |
| *D21H 17/04* | (2006.01) |
| *D21H 21/00* | (2006.01) |
| *D21H 17/06* | (2006.01) |
| *D21H 21/20* | (2006.01) |
| *D21H 19/16* | (2006.01) |

(52) U.S. Cl.
CPC ............ *D21H 27/007* (2013.01); *D21H 17/04* (2013.01); *D21H 17/06* (2013.01); *D21H 19/16* (2013.01); *D21H 21/00* (2013.01); *D21H 27/002* (2013.01); *B32B 2555/02* (2013.01); *D21H 21/20* (2013.01)

(58) Field of Classification Search
CPC ........ D21H 17/04; D21H 17/06; D21H 19/16; D21H 21/00; D21H 21/20; D21H 27/002; D21H 27/007; D21H 21/22; D21H 27/001; B32B 2555/02; Y10T 428/273
See application file for complete search history.

(56) References Cited

U.S. PATENT DOCUMENTS

| | | | |
|---|---|---|---|
| 3,989,609 A | 11/1976 | Brack | |
| 4,218,294 A | 8/1980 | Brack | |
| 4,288,479 A | 9/1981 | Brack | |
| 5,266,592 A * | 11/1993 | Grub | A61K 8/4973 424/48 |
| 5,650,218 A * | 7/1997 | Krzysik | A61K 8/0208 428/195.1 |
| 5,989,380 A | 11/1999 | Frischer | |
| 7,771,566 B2 * | 8/2010 | Hilbig | D21H 27/40 162/117 |
| 7,972,475 B2 * | 7/2011 | Chan | D21H 17/33 162/109 |
| 8,480,852 B2 * | 7/2013 | Wenzel | A61K 8/31 162/124 |
| 8,940,323 B2 * | 1/2015 | Shannon | D21H 27/002 424/443 |
| 9,181,465 B2 * | 11/2015 | Seidling | A61K 8/0208 |
| 2002/0152630 A1 * | 10/2002 | Lindsay | D21F 5/004 34/111 |
| 2003/0139717 A1 | 7/2003 | Qin et al. | |
| 2006/0029628 A1 * | 2/2006 | Kleinwaechter | A61K 8/0208 424/402 |
| 2007/0196405 A1 * | 8/2007 | Wilker | A61K 8/0208 424/402 |
| 2009/0297586 A1 * | 12/2009 | Shannon | D21H 27/002 424/443 |
| 2010/0136268 A1 * | 6/2010 | Rasch | B32B 7/14 428/34.1 |
| 2011/0123578 A1 * | 5/2011 | Wenzel | A61K 8/37 424/401 |
| 2011/0124769 A1 * | 5/2011 | Moen | A47K 10/16 523/105 |
| 2014/0037701 A1 * | 2/2014 | Mellin | A61K 8/31 424/401 |
| 2014/0037896 A1 * | 2/2014 | Ho-Kleinwaechter | B32B 29/005 428/125 |
| 2016/0022553 A1 * | 1/2016 | Seidling | A61K 8/0208 514/546 |
| 2018/0237995 A1 * | 8/2018 | MacDonald | D21H 17/04 |
| 2019/0223680 A1 * | 7/2019 | Yamazaki | D21H 17/63 |

FOREIGN PATENT DOCUMENTS

| | | | |
|---|---|---|---|
| CN | 103108616 A | 5/2013 | |
| EP | 1250940 A1 * | 10/2002 | A61L 15/20 |
| EP | 1250941 A1 * | 10/2002 | A61L 15/46 |
| JP | 56-157474 A | 12/1981 | |
| JP | 58-021605 A | 2/1983 | |

(Continued)

OTHER PUBLICATIONS

Machine Translation of JP 2008088586 A (Year: 2008).*

(Continued)

*Primary Examiner* — Jose A Fortuna
(74) *Attorney, Agent, or Firm* — Kimberly-Clark Worldwide, Inc.

(57) ABSTRACT

The present disclosure is directed towards a paper product which can remain intact prior to and during usage and can self-disintegrate over time. Such a paper product can occupy less space in a user's waste bin following usage when compared with a similar paper product that does not self-disintegrate. Such a paper product can be treated with a topical binder that includes a sublimable material. The sublimable material can sublime away from the paper product over time thereby reducing the ability of the fibers of the paper product to remain bonded together.

12 Claims, No Drawings

(56) References Cited

FOREIGN PATENT DOCUMENTS

| | | | | |
|---|---|---|---|---|
| JP | 2008-088586 A | | 4/2008 | |
| JP | 2008088586 A | * | 4/2008 | ............ D21H 27/00 |
| WO | WO-9323005 A1 | * | 11/1993 | ............... A61K 8/34 |
| WO | WO-2007100665 A2 | * | 9/2007 | ........... A61K 8/0208 |
| WO | WO 2013/104462 A1 | | 7/2013 | |
| WO | WO-2017040372 A1 | * | 3/2017 | ............ D21H 21/00 |

OTHER PUBLICATIONS

Watson et al., in "New compounds with the menthol cooling effect," Journal of the Society of Cosmetic Chemist, vol. 29 pp. 185-200. (Year: 1978).*

* cited by examiner

ARTICLE OF COMMERCE TREATED WITH SUBLIMABLE MATERIAL

RELATED APPLICATIONS

The present application claims priority to U.S. Provisional Application No. 62/211,952, filed Aug. 31, 2015, the contents of which are hereby incorporated by reference in a manner consistent with the present application.

BACKGROUND OF THE DISCLOSURE

In the manufacture of paper products, such as tissues, towels, napkins, wipes, and the like, a wide variety of product characteristics must be given attention in order to provide a final paper product with the appropriate blend of attributes suitable for the paper product's intended purposes. Among these various attributes, improving softness, strength, absorbency, bulk and stretch have always been major objectives, particularly for paper products in the consumer markets.

Softness is generally how the paper product feels to the user on his or her face or hand. Softness generally depends on various physical properties, including the surface feel and stiffness of the paper product. The stiffness, in turn, generally depends on the strength of the paper product. The strength of the paper product is the product's ability to maintain its physical integrity and to resist tearing or shredding under use conditions, particularly when wet. Strength is a combination of tensile strength and stretch. When one is higher, the other can be lower and still maintain "strength." Also, when a certain level of wet strength is needed, using a binder that provides a higher ratio of wet/dry strength allows dry strength to be lower and, therefore, softness to be higher.

Traditionally, many paper products have been made using a wet-laying process in which a significant amount of water is removed from a wet-laid web by pressing or squeezing water from the web prior to final drying. The web is supported by an absorbent papermaking felt and is squeezed between the felt and the surface of a rotating heated cylinder, such as a Yankee dryer, using a pressure roll as the web is transferred to the surface of the Yankee dryer. The dried web is then dislodged from the Yankee dryer with a doctor blade, which is known as creping. Creping serves to partially debond the dried web by breaking many of the bonds previously formed during the web-processing stages of the process. The web may be creped dry or wet. Creping can greatly improve the feel of the web, but at the expense of a significant loss of strength.

More recently, through-air drying has become an alternate means of drying paper webs. Through-air drying provides a relatively noncompressive method of removing water from the web by passing hot air through the web until it is dry. More specifically, a wet-laid web is transferred from a forming fabric to a course, highly permeable through-air drying fabric and retained on the through-air drying fabric until fairly dry. The resulting through-air dried web is bulkier than a conventionally creped sheet because the web is less compressed. Squeezing water from the wet web is eliminated, although the use of a pressure roll to subsequently transfer the web to a Yankee dryer for creping may still be used.

Such paper products can have, therefore, the desirable attributes of softness, strength, absorbency, bulk and stretch. Disposal of the paper products, however, can result in the paper product occupying a large space in a user's waste bin. This can result in overflow of the waste bin and unsanitary conditions in the area around the waste bin. An attempt by the user to compact the refuse in their waste bin can result in the user's hands coming into contact with non-sanitary materials. A mechanized attempt to handle the overflow of paper products from waste bins is to utilize self-compacting trash receptacles. Such trash receptacles, however, are expensive and require electrical power in order to operate.

There is a need for a paper product that can maintain its desirable attributes and remain intact prior to and during usage and can experience a reduction in strength following usage. There is a need for a paper product which can occupy a smaller space in a user's waste bin. There is a need for a paper product that can self-disintegrate over time after usage.

SUMMARY OF THE DISCLOSURE

In various embodiments, a paper product can be a nonwoven sheet formed from a plurality of papermaking fibers and having first and second outer surfaces, wherein at least one outer surface comprises a topically applied binder composition comprising at least about 5% wt/wt sublimable material. In various embodiments, the sublimable material sublimes at room temperature. In various embodiments, the sublimable material has a vapor pressure in the range of from about 0.01 to about 1.0 mmHg at 25° C. In various embodiments, the sublimable material is cyclododecane. In various embodiments, the sublimable material is menthol.

In various embodiments, an article of commerce can include a paper product which can be a nonwoven sheet formed from a plurality of papermaking fibers and having first and second outer surfaces, wherein at least one outer surface comprises a topically applied binder composition comprising at least about 5% wt/wt sublimable material and an air impermeable material overwrapping the paper product. In various embodiments, the air impermeable material comprises a thermoplastic film. In various embodiments, the air impermeable material comprises a basis weight from about 15 gsm to about 75 gsm. In various embodiments, the air impermeable material comprises a thickness from about 300 microns to about 600 microns. In various embodiments, the sublimable material sublimes from the paper product in a time period of less than about 240 hours following separation of the air impermeable material from the paper product. In various embodiments, the sublimable material sublimes away from the paper product in less than about 120 hours.

In various embodiments, a method of making an article of commerce wherein the article of commerce can include a paper product which can be a nonwoven sheet formed from a plurality of papermaking fibers and having first and second outer surfaces, wherein at least one outer surface comprises a topically applied binder composition comprising at least about 5% wt/wt sublimable material and an air impermeable material overwrapping the paper product, can include the steps of providing a plurality of papermaking fibers, forming the papermaking fibers into a nonwoven sheet comprising a first and a second outer surface, and applying to at least one of the outer surfaces of the nonwoven sheet with at least 5% wt/wt sublimable material. In various embodiments, the step of applying to at least one of the outer surfaces of the nonwoven sheet at least about 5% wt/wt sublimable material further includes the step of applying the sublimable material in a pattern that coats from about 75% to about 95% of the surface area of the outer surface of the paper product to which the sublimable material is applied.

In various embodiments, a method of binding superabsorbent particle material into a matrix form can include the steps of providing a plurality of superabsorbent particle material and applying to an outer surface of the superabsorbent particle material at least about 5% wt/wt sublimable material.

In various embodiments, a method of binding human hair fibers into a matrix form can include the steps of providing a plurality of human hair fibers and applying to an outer surface of the human hair fibers at least about 5% wt/wt sublimable material.

DETAILED DESCRIPTION OF THE DISLOSURE

The present disclosure is directed towards a paper product which can remain intact prior to and during usage and can self-disintegrate over time. Such a paper product can occupy less space in a user's waste bin following usage when compared with a similar paper product that does not self-disintegrate. Such a paper product can be treated with a topical binder that includes a sublimable material. The sublimable material can sublime away from the paper product over time thereby reducing the ability of the fibers of the paper product to remain bonded together.

A "paper product" as described herein is meant to include products such as bath tissues, facial tissues, paper towels, industrial wipes, food service wipes, napkins, medical pads, and other similar products. The paper product can be a nonwoven sheet formed from a plurality of papermaking fibers and having a first outer surface and a second outer surface. The paper product may have one, two, three or more plies and each ply can be made from any suitable type(s) of papermaking fiber. The paper product, as a nonwoven sheet, can further be incorporated into an absorbent article as a component of the absorbent article.

Papermaking fibers can include any pulp fibers, cellulosic fibers, other natural fibers, non-cellulosic synthetic fibers, chemithermomechanical fibers, or recycled cellulosic fibers which are known to be useful for making paper products. Fibers suitable for making a paper product can include, but are not limited to, any natural or synthetic cellulosic fibers including, but not limited to, nonwoody fibers, such as cotton, wool, human hair, boar bristles, abaca, kenaf, sabai grass, flax, esparto grass, straw, jute hemp, bagasse, milkweed floss fibers, and pineapple leaf fibers; and woody fibers such as those obtained from deciduous and coniferous trees, including softwood fibers, such as northern and southern softwood kraft fibers; hardwood fibers, such as eucalyptus, maple, birch, and aspen. Woody fibers can be prepared in high-yield or low-yield forms and can be pulped in any known method, including kraft, sulfite, high-yield pulping methods and other known pulping methods. A portion of the fibers, such as up to 50% or less by dry weight, or from about 5% to about 30% by dry weight, can be synthetic fibers such as rayon, polyolefin fibers, polyester fibers, polypropylene fibers, polystyrene fibers, butylene fibers, bicomponent sheath-core fibers, copolymer fibers, multi-component binder fibers, and the like. Any known bleaching method can be used. Synthetic cellulose fiber types include rayon in all its varieties and other fibers derived from viscose or chemically modified cellulose. Chemically treated natural cellulosic fibers can be used such as mercerized pulps, chemically stiffened or crosslinked fibers, or sulfonated fibers. Other papermaking fibers that can be used include recycled cellulosic fibers and high yield fibers. As used herein, recycled cellulosic fibers means any cellulosic fiber which has previously been isolated from its original matrix via physical, chemical or mechanical means and, further, has been formed into a fiber web, dried to a moisture content of about 10 weight percent or less and subsequently reisolated from its web matrix by some physical, chemical or mechanical means. High yield fibers are those papermaking fibers produced by pulping processes providing a yield of about 65% or greater, more specifically about 75% or greater, and still more specifically about 75% to about 95%. Yield is the resulting amount of processed fibers expressed as a percentage of the initial wood mass. Such pulping processes include bleached chemithermomechanical pulp, chemithermomechanical pulp, pressure/pressure thermomechanical pulp, thermomechanical pulp, thermomechanical chemical pulp, high yield sulfite pulps, and high yield kraft pulps, all of which leave the resulting fibers with high levels of lignin. High yield fibers are known for their stiffness in both dry and wet states relative to typical chemically pulped fibers.

Paper products can be made with a homogeneous fiber furnish or can be formed from a stratified fiber furnish producing layers within the single- or multi-ply product. Stratified base webs of the paper product can be formed using equipment known in the art, such as a multi-layered headbox. Both strength and softness of the base web can be adjusted as desired through manufacture of layers, such as those produced from stratified headboxes.

For instance, different fiber furnishes can be used in each layer in order to create a layer with the desired attributes. For example, layers containing softwood fibers have higher tensile strengths than layers containing hardwood fibers. Hardwood fibers, on the other hand, can increase the softness of the paper product. In an embodiment, a single ply can include a first outer layer and a second outer layer containing primarily hardwood fibers. The hardwood fibers can be mixed, if desired, with recycled cellulosic fibers in an amount up to about 10% by weight and/or softwood fibers in an amount up to about 10% by weight. The ply can further include a middle layer positioned in between the first outer layer and the second outer layer. The middle layer can contain primarily softwood fibers. If desired, other fibers such as high-yield fibers or synthetic fibers may be mixed with the softwood fibers in an amount up to about 10% by weight.

When constructing a ply from a stratified fiber furnish, the relative weight of each layer can vary depending upon the particular application. For example, in an embodiment, when constructing a ply containing three layers, each layer can be from about 15% to about 40% of the total weight of the ply, such as from about 25% to about 35% of the weight of the ply.

Wet strength resins may be added to the furnish as desired to increase the wet strength of the final paper product. Useful wet strength resins include diethylenetriamine (DETA), triethylenetetramine (TETA), tetraethylenepentamine (TEPA), epichlorhydrin resin(s), polyamide-epichlorhydrin (PAE), or any combinations thereof, or any resins to be considered in these families of resins. Particularly preferred wet strength resins are polyamide-epichlorhydrin (PAE) resins. Commonly PAE resins are formed by first reacting a polyalkylene polyamine and an aliphatic dicarboxylic acid or dicarboxylic acid derivative. A polyaminoamide made from diethylenetriamine and adipic acid or esters of dicarboxylic acid derivatives is most common. The resulting polyaminoamide is then reacted with epichlorohydrin. Useful PAE resins are sold under the tradename Kymene® (commercially available from Ashland, Inc., Covington, Ky.).

Similarly, dry strength resins can be added to the furnish as desired to increase the dry strength of the final paper product. Such dry strength resins include, but are not limited to carboxymethyl celluloses (CMC), any type of starch, starch derivatives, gums, polyacrylamide resins, and others as are well known. Commercial suppliers of such resins are the same as those that supply the wet strength resins discussed above.

The paper products can generally be formed by any of a variety of papermaking processes known in the art. In various embodiments, the base web of the paper product is formed by through-air drying and can be either creped or uncreped. For example, a papermaking process can utilize adhesive creping, wet creping, double creping, embossing, wet-pressing, air pressing, through-air drying, creped through-air drying, uncreped through-air drying, as well as other steps in forming the base web. Some examples of such techniques are disclosed in U.S. Pat. Nos. 5,048,589, 5,399,412, 5,129,988 and 5,494,554 all of which are incorporated herein in a manner consistent with the present disclosure. When forming multi-ply tissue products, the separate plies can be made from the same process or from different processes as desired.

In various embodiments, the base web is formed by an uncreped through-air drying process, such as the processes described, for example, in U.S. Pat. Nos. 5,656,132 and 6,017,417, both of which are hereby incorporated by reference herein in a manner consistent with the present disclosure.

In an uncreped through-air drying process, a twin wire former can have a papermaking headbox which injects or deposits a stream of an aqueous suspension of papermaking fibers onto the forming fabric which serves to support and carry the newly-formed wet web downstream in the process as the wet web is partially dewatered to a consistency of about 10 dry weight percent. Additional dewatering of the wet web may be carried out by known paper making techniques, such as vacuum suction boxes. The wet web may be additionally dewatered to a consistency of greater than 20 percent, more specifically between about 20 to about 40 percent, and more specifically about 20 to about 30 percent. The wet web is then transferred from the forming fabric to a transfer fabric traveling at a slower speed than the forming fabric in order to impart increased strength into the web. Transfer can be carried out with the assistance of a vacuum shoe. The wet web is then transferred from the transfer fabric to the through-air drying fabric with the aid of a vacuum transfer roll or a vacuum transfer shoe. The through-air drying fabric can be traveling at about the same speed or a different speed relative to the transfer fabric. If desired, the through-air drying fabric can be run at a slower speed to further enhance stretch. While supported by the through-air drying fabric, the wet web is dried to a consistency of about 94 percent or greater by the through-air dryer. The drying process can be any noncompressive drying method which tends to preserve the bulk or thickness of the wet web including, without limitation, through-air drying, infrared radiation, microwave drying, etc.

In order to provide stretch to the paper product, a speed differential is provided between fabrics at one or more points of transfer of the wet web. This process is known as rush transfer. The speed difference between the forming fabric and the transfer fabric can be from about 5 to about 75 percent or greater, such as from about 10 to about 35 percent. For instance, in an embodiment, the speed difference can be from about 15 to about 25 percent, based on the speed of the slower transfer fabric. The stretch can be imparted to the web using a single differential speed transfer or two or more differential speed transfers of the wet web prior to drying. Hence there can be one or more transfer fabrics. The amount of stretch imparted to the web can hence be divided among one, two, three or more differential speed transfers. Rush transfer from one fabric to another can follow the principles taught in any one of the following patents, U.S. Pat. Nos. 5,667,636, 5,830,321, 4,440,597, 4,551,199, 4,849,054, all of which are hereby incorporated by reference herein in a manner consistent with the present disclosure.

Softening agents can be used to enhance the softness of the paper product and such softening agents can be incorporated with the fibers before, during, or after formation of the aqueous suspension of fibers. Such agents can also be sprayed or printed onto the web after formation of the wet web. Suitable agents include, but are not limited to, fatty acids, waxes, quaternary ammonium salts, dimethyl dehydrogenated tallow ammonium chloride, quaternary ammonium methyl sulfate, carboxylated polyethylene, cocamide diethanol amine, coco betaine, sodium lauryl sarcosinate, partly ethoxylated quaternary ammonium salt, distearyl dimethyl ammonium chloride, polysiloxanes, and the like. The softening agents can be added in an amount from about 0.05, 0.25, or 0.5 to about 0.75 or 1 weight percent based upon the weight of the fiber.

The basis weight of webs made can vary depending upon the final paper product. In general, the basis weight of the web may vary from about 15, 16, 18, 30 or 30 gsm to about 32, 34, 36, 40, 45, 60 or 80 gsm.

In various embodiments, a topical binder may be used to bond the papermaking fibers together which can impart added strength to the final paper product. In various embodiments, a binder can be added onto each side of an uncreped through-dried web and each side of the web can then be creped. Binder may be "added" by gravure printing, flexo printing, coating, spraying, ink jet, or hot melt applications. In various embodiments, the web for the paper product is first formed by conventional means and then rush-transferred and through-air dried (and not creped or calendared). Next, each side of the uncreped, through-air dried base sheet has binder added to it, and then each side of the base sheet is creped.

The binder composition can be applied to one or more surfaces of the ply or plies within the product. For example, a single-ply product can have one or both surfaces treated with the binder composition. A two-ply product can have one or both outer surfaces treated with the binder composition and/or one or both inner surfaces treated with the binder composition. In the case of a two-ply product, it can be advantageous to have one or both binder-treated surfaces plied inwardly in order to expose the untreated surface(s) of the plies on the outside of the product for purposes of hand-feel or absorbency. When the binder is applied to the inner surfaces of a multi-ply product, the binder also provides a means of bonding the plies together. In such cases, mechanical bonding may not be required. In the case of a three-ply product, the same options are available. In various embodiments, the binder composition can be applied to the surface of the paper product such that the binder composition fully covers the surface area of the surface of the paper product to which the binder composition is applied. In various embodiments, the binder composition can be applied to the surface of the paper produce in a pattern of coverage such that less than the complete surface area of the surface of the paper product to which the binder composition is applied has coverage by the binder composition. In various embodiments, such patterns can include, but are not limited to, dots, stripes, swirls, geometric shapes, amorphous shapes, etc. These 'binder points' can hold the fibers as a web or mat to allow processing. The surface area of the coverage of the binder composition on the fibrous web can be about 5 percent or greater, more specifically about 30 percent or greater, still more specifically about 75 percent or greater, sill more specifically, from about 5 to about 90 percent or from about 20 to about 90 percent, or from about 75 to about 90 percent.

The binder composition can be applied to one or both surfaces of the fibrous web by any suitable method such as printing, spraying, coating, foaming and the like. Curing temperatures for the binder composition can be about 260° C. or less, more specifically about 120° C. or less, more specifically about 100° C. or less, more specifically about 40° C. or less, more specifically from about 10 to about 260° C. and still more specifically from about 20 to about 120° C. It will be appreciated that although the binder compositions can be cured at relatively low temperatures, the rate of curing can be accelerated at higher temperatures associated with curing conventional binders.

In various embodiments, the binder composition includes a sublimable material. A binder composition including a sublimable material can bond the papermaking fibers together and impart an initial strength to the paper product prior to and during usage of the paper product. The sublimable material can then sublime away from the paper product following usage of the paper product. As the sublimable material sublimes away from the paper product, the bonds holding the papermaking fibers together disappear leaving a loose mass of papermaking fiber which can collapse into a smaller area in a waste bin. In various embodiments, the binder composition incudes at least about 5% wt/wt of a sublimable material.

In various embodiments, the sublimable material can sublime away from the paper product over time. In various embodiments, the sublimable material can sublime away from the paper product over time when the paper product is exposed to ambient air such as may occur when a paper product is separated from an air impermeable material overwrapping the paper product. In various embodiments, the sublimable material can sublime away from the paper product in a time frame of less than about 240, 120, 100, 99, 72, 25, 12, 10, 8, 5, 3, or 2 hours. As the sublimable material sublimes away from the paper product, the paper product can experience a decrease in the integrity of the paper product. When the sublimable material has completely sublimed away from the paper product, a loose mass of fibers will remain.

Sublimable materials may be sublimable hydrocarbons e.g., adamantine, endo-trimethylenenorbornane, cyclododecane, trimethylnorbornane, norbornane, naphthalene, camphor, menthol, and the like, as well as sublimable polar compounds e.g., dimethyl fumarate, benzoic acid, tri-oxymethylene, cumarin, α-dichlorobenzene, caprolactam, 1,4-cyclohexanediol, phthalide, lactide, triisopropyltrioxane and the like.

Preferred sublimable materials are those which have a molecular weight of 200 maximum, preferably of 170 maximum. Preferred sublimable materials include those which exhibit low odor or no discernible odor at their sublimation temperatures so as not to impart an undesirable malodor to the treated paper products. The sublimable material also leaves little or no readily visible residue upon the paper products.

In various embodiments, the sublimable material can be one that has a sublimation temperature in the range of from 18° C. to 80° C. According to one preferred embodiment, the sublimable material exhibits a sublimation temperature in the range of from about 18° C. to about 65° C., but more preferably from about 18° C. to about 40° C. In various embodiments, the sublimable material exhibits a sublimation temperature at room temperature, or from about 20° C. to about 24° C. However, higher or lower sublimation temperatures may also be used.

In various embodiments, the sublimable material can have vapor pressure values in the range from about 0.01, 0.02, 0.03, 0.04, 0.05, 0.06, 0.07, 0.08, 0.09, or 0.1 mmHg at 25° C. to about 0.2, 0.3, 0.4, 0.5, 0.6, 0.7, 0.8, 0.9, or 1.0 mmHg at 25° C. Examples of vapor pressure values of some suitable sublimable materials are included in Table 1 below.

TABLE 1

| Sublimable Material | Vapor Pressure mmHg at 25° C. and at 1 atm | Melting Point ° C. |
| --- | --- | --- |
| Cyclododecane | 0.0295 | 60 |
| Camphor | 0.65 | 175 |
| Menthol | 0.064 | 31 |
| Napthalene | 0.087 | 80 |

In various embodiments, a plurality of sublimable materials can be used and each of the sublimable materials is non-reactive in the presence of the other sublimable materials used. In various embodiments, the sublimation temperatures of each of the sublimable materials does not differ from the sublimation temperatures of the other sublimable materials present by more than 45° C., preferably by no more than 40° C., more preferably by no more than 35° C.

Certain further preferred sublimable materials may include one or more materials selected from the group which includes: alicyclic hydrocarbons, which may be saturated or unsaturated or optionally substituted by one or more groups such as oxygen or nitrogen, for example, trimethylene norbornane (molecular wt. 136.13); cyclic hydrocarbons which may be saturated or unsaturated or optionally substituted by one or more groups such as oxygen and nitrogen, e.g., cyclododecane (molecular wt. 168.32), tetrahydrodicyclopentadiene (molecular wt. 136.21), camphor (molecular wt. 152.12), menthol (molecular wt. 156.27), naphthalene (molecular wt. 128.17), aliphatic or aromatic organic acids, e.g., dimethyl fumarate (molecular wt 144.13), benzoic acid (molecular wt 122.12), as well as trioxane. These materials are presented by way of example only and other suitable materials may also be used.

There is no limitation to methods of applying the sublimable materials to the fibers of the paper products. Examples of such processes include 1) a method of applying the sublimable material by heating it or by placing it under reduced pressure so that it condenses on the fibers; 2) a method of applying the sublimable material by applying a solution of the sublimable material in a solvent to the fibers; and 3) a method of applying the sublimable material by applying an emulsion or dispersion of the sublimable material on the fibers.

The sublimable material can be removed from the paper product by the sublimation of said material without the application of additional procedures after the formation of the paper products. Additionally, there is no problem of the sublimable material remaining in the fibers. Thus, the sublimable substance exhibits no adverse influence on the converting operations.

After the paper product is formed and dried, the paper product can undergo any subsequent converting process. In an embodiment, the paper product can undergo a shear calendaring process in order to generate a high value of fuzziness while maintaining sufficient tensile strength. In an embodiment, the paper product can be placed into final packaging comprising an air impermeable material.

In various embodiments, for example, the paper product can be overwrapped by an air impermeable material such as a packaging film to form an article of commerce. In various embodiments, the packaging film can be a plastic film, and more preferably a thermoplastic film with the thermoplastic being either a monolayer or a laminate. Useful monolayer or laminate thermoplastic materials include polyesters, polyolefins (including homopolymers and copolymers), polyamides, polyethylenes and ethylene copolymers, polypropylenes and propylene copolymers, polyethylene terephthalates, vinyl polymers and copolymers, and acrylic polymers and copolymers. The laminates include thermoplastic/paper laminates. A useful thermoplastic is biaxially oriented polypropylene. The overwrap for the paper product is not limited to a plastic as the packaging film. In certain embodiments the packaging film may be a paper over-wrap or other material.

In embodiments where the packaging film is a plastic film, it will preferably have a basis weight from about 15 gsm to about 75 gsm. The film material will generally have a thickness of about 300 microns to about 600 microns.

While the present disclosure is generally directed towards a paper product, such as, for example, bath tissues, facial tissues, paper towels, industrial wipes, food service wipes, medical pads, and other similar products, which can be treated with a sublimable material such that the paper product can disintegrate over time, it is to be understood that the paper product can be a nonwoven material which can be incorporated into an absorbent article as a component of the absorbent article. For example, in various embodiments, the paper product, as a nonwoven material, can be incorporated into absorbent articles such as, but not limited to, diapers, training pants, feminine pads, sanitary napkins, lines, and adult incontinence garments. The papermaking fibers described herein can have absorbent properties and the paper product incorporated into an absorbent article can provide the absorbent article with absorbent properties. Utilizing the paper product described herein in an absorbent article can result in the sublimable material providing handling integrity to the papermaking fibers during the manufacture of the absorbent article.

In various embodiments, the sublimable material described herein can be utilized to coat materials other than papermaking fibers. Such additional materials can include, but are not limited to, individual superabsorbent particle materials which are commonly utilized in absorbent articles or other types of powders. As with the incorporation of a paper product into an absorbent article, utilizing the sublimable material described herein to coat superabsorbent particle materials can bind the superabsorbent particle materials or other powders together into a matrix form thereby providing the superabsorbent particle material or other powders with handling integrity during the manufacture of the absorbent article. The sublimable material can then sublime away from the superabsorbent particle material without having caused a material change to the properties of the superabsorbent particle material.

Additional applications of this novel binder could be for temporary hold or set matrix which would hold the fibers in place. An example would be the use of the binder composition as a hair coating to allow the hair to be dressed or shaped in a style which would then simply relax to its original shape or form after the coating had sublimed away. This could be short term hold (<3 hours) while ribbons or pins or items are dressed into the hair or for longer time (~8-12 hours) with heavier coatings to hold the styling or shaping during the hairdressing and all the way through the event (fashion show or reception or party) returning to its former state by morning (8-12 hours). This application could be applied to human hair, wigs, animal hair, animal fur, feathers, fabrics and the like.

EXAMPLE 1

A binder composition containing cyclododecane was formulated and tested with the test results reported in Table 2. Cellulose fiber handsheets (10"×14") of a single ply of NB416 cellulose fibers (bleached Kraft pulp fibers available from Weyerhaeuser, Federal Way, Wa., U.S.A.) were formed using an air-laid fiber sheet former (as described as the Buckeye handsheet former in US Pub. No. 2005/0268274 to Beuther et al., which is herein incorporated by reference in its entirety to the extent it does not conflict with the contents of the current disclosure). From the handsheets, two 4"×4" squares were cut and weighed to provide an "uncoated weight". The 4"×4" squares were lightly sprayed, at a 45% wt./wt. add-on, (using a Prevail sprayer available from Chicago Aerosol, Coal City, Ill., U.S.A) on both sides with 25% wt./wt. cyclododecane (available from Kremer Pigments Co, New York, N.Y., U.S.A.) in hexanes. The 4"×4" squares were placed in a fume hood for 5 minutes to flash off the hexanes. The 4"×4" squares were weighed again following the 5 minutes. Each of the coated 4"×4" squares had good integrity and could be handled as if drying hands without any sign of tearing or not absorbing water from wet hands.

One of the two 4"×4" squares was placed in a Ziplock® bag while the other 4"×4" square was left on a baking sheet in the fume hood. The weight of each sample was measured over time until the open-air sample had returned to the original uncoated weight. The results can be seen in Table 2. Over time, the open-air sample became delicate and easily fell apart, wherein the sealed sample had very little weight change and retained its good integrity.

TABLE 2

| Time (Hr) | Sample in Bag Weight (g) | Sample in Open Air Weight (g) |
| --- | --- | --- |
| 0 | 0.73 | 0.73 |
| 72 | 0.71 | 0.57 |
| 99 | 0.71 | 0.53 |
| 120 | 0.68 | 0.48 |
| 240 | 0.67 | 0.37 |

The above example demonstrates that a binder composition containing a sublimable material can be used to bind papermaking fibers together and impart strength to the paper product. Furthermore, the surrounding of the paper product in a packaging material can maintain the strength and integrity of the paper product over time until usage by a consumer. Further, the above example illustrates that upon exposure to open air the binder composition containing a sublimable material can experience sublimation over time and can self-disintegrate. The self-disintegration can leave a smaller volume of material in a user's waste bin.

EXAMPLE 2

Binder compositions containing sublimable materials were formulated and tested with the results in Table 3. Four sublimable materials were investigated: Camphor, Menthol, Napthalene, and Cyclododecane. Each of the sublimable materials were dissolved in hexanes (30% wt/wt) and then each of the solutions was sprayed with a Prevail sprayer onto a pair of pre-weighed 2"×2" samples of loose cellulose fiber mats containing NB416 cellulose fiber. Each sample pair was air-dried for 5 minutes and re-weighed. One sample in a pair was placed in a Ziplock® bag while the other identical sample of the pair was left uncovered in a fume hood. Each sample was re-weighed over time to determine the weight loss.

All sublimable material compositions were observed to provide a stiffening property to the loose fiber mat, allowing it to be handled without the mat coming apart. Table 3 below shows the results of weight loss over time.

TABLE 3

| Sample | Sample Weight Pre-Coating (g) | Initial Weight Post Coating (T0) (g) | Weight Post Coating T = 25 Hours (g) | Weight Post Coating T = 6 days (g) |
|---|---|---|---|---|
| Cyclododecane (bag) | 0.32 | 0.46 | 0.46 | 0.37 |
| Cyclododecane (air) | 0.32 | 0.46 | 0.44 | 0.34 |
| Camphor (bag) | 0.22 | 0.32 | 0.24 | — |
| Camphor (air) | 0.24 | 0.30 | 0.24 | — |
| Menthol (bag) | 0.30 | 0.37 | 0.36 | 0.31 |
| Menthol (air) | 0.30 | 0.36 | 0.33 | 0.30 |
| Napthalene (bag) | 0.21 | 0.31 | 0.24 | — |
| Napthalene (air) | 0.18 | 0.25 | 0.18 | — |

The above example demonstrates that a binder composition containing a sublimable material can be used to bind papermaking fibers together into a mat. Furthermore, the surrounding of the fibers in a packaging material can maintain the strength and integrity of the mat over time until usage by a consumer. Further, the above example illustrates that upon exposure to open air the binder composition containing a sublimable material can experience a faster sublimation over time and can self-disintegrate. The self-disintegration can leave a smaller volume of material in a user's waste bin.

EXAMPLE 3

In order to see if fiber composition would play a role in the ability of a sublimable material to coat and form a solid mat from loose fibers, the following experiment was conducted with the results included in Table 4. A sample of about 1 gram of a mass of loose fiber was placed on a paper towel (Scott®) and then sprayed, with a Prevail sprayer, with a solution of cyclododecane dissolved in hexanes (40% wt/wt solution) and allowed to sit for 5 minutes at room temperature. After 5 minutes, the fiber mat was weighed and observations were made regarding the integrity of the fiber mat. Integrity of the fiber mat was observed by handling the fiber mat to determine if the fiber mat would return to a mass of loose fiber.

TABLE 4

| Fiber Sample | Mat weight (g) | Matt weight after coating (g) | Properties |
|---|---|---|---|
| Cellulose | 1.0 | 1.4 | Solid flexible mat that has integrity |
| Cotton | 1.0 | 1.3 | Solid flexible mat that has integrity |
| Wool | 1.0 | 1.4 | Solid flexible mat that has integrity |
| Bristle (boar) | 1.0 | 1.4 | Solid flexible mat that has integrity |
| Human hair | 1.0 | 1.3 | Solid flexible mat that has integrity |

The above results show that the subliming binder coating can be used on a variety of fiber types to make a flexible mat with good integrity.

EXAMPLE 4

This example shows how the temporary sublimable coating can be used to hold loose fibers in place during manufacturing process and then sublime away to leave loose fibers now in an constructed article ready for use. Cellulose fiber handsheets (10"×14") of a single ply of NB416 cellulose fibers (bleached Kraft pulp fibers available from Weyerhaeuser, Federal Way, Wa., U.S.A.) were formed using an air-laid fiber sheet former (as described as the Buckeye handsheet former in US Pub. No. 2005/0268274 to Beuther et al., which is herein incorporated by reference in its entirety to the extent it does not conflict with the contents of the current disclosure). From the handsheets, two 8"×3" samples were cut and weighed to provide an "uncoated weight". These samples were then sprayed, at a 45% wt/wt add-on (with a Prevail sprayer) on one side with a 25% wt/wt solution of cyclododecane in hexanes. The samples were left for 5 minutes in a fume hood. The samples had good integrity to be handled and inserted into Poise® pad shells (regular size, moderate absorbency (Kimberly-Clark Corporation, Neenah Wis.) and assembly completed. After 3 hours the pads were inspected and found to comprise loose cellulose fibers in the absorbent core. Thus the sublimable binder held the loose fibers in a conformable matrix to allow handling integrity to assemble the pad in a manufacturing process mimic. This could offer significant benefits to further simply the manufacture of articles having loose fibers that have to be contained in articles of manufacture and potentially reducing linting and dusting issues.

EXAMPLE 5

This example shows how the temporary sublimable binder can be used to hold loose powders or particles in a matrix thereby improving the process of incorporating them into articles of manufacture (and an example, absorbent articles that contain superabsorbent particles). On a 12"×20" metal cookie tray was placed 20 gram of superabsorbent powder (Hysorb® available from BASF SE Germany) and the tray gently shaken to spread the powder as a uniform layer of particles. Next the powder layer was gently sprayed (Prevail) with a 25% wt/wt solution of cyclododecane in hexanes to give a 45% wt/wt add-on. After being placed in the fume hood for 5 minutes the sheet of particles with cyclododecane binder could be removed from the tray and handled as a sheet with good integrity. This sheet was cut into 8"×3" samples and placed into Poise® pad shells missing the absorbent core (regular size, moderate absorbency, Kimberly-Clark Corporation, Neenah Wis.). The assembling process was conducted and the pads produced. After 2 hours the pads were inspected and the particle sheet had returned to loose superabsorbent powders within the pad. This example illustrates the potential in improving the handling and manufacturing of absorbent products that contain superabsorbent powders. Migration and loss of powders are common in the manufacturing process of absorbent articles that lead to cost and dusting issues, could be easily overcome using the sublimable binder composition.

EXAMPLE 6

This example shows how the temporary sublimable coating can be used to hold loose fibers in place and then sublime away to return the loose fibers to their loose form. Samples of human hair and wool were place in a container as a loose flat bundle and sprayed (with a Prevail sprayer) with a 25% wt/wt solution of cyclododecane in hexanes to give a 45% wt/wt add-on. After being placed in the fume hood for 5 minutes the sheet of fibers with cyclododecane binder could be removed from the tray and handled as a sheet with good integrity. After 2 hours at ambient conditions the fibers had returned to a loose bundle of fibers.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Many modifications and variations of the present disclosure can be made without departing from the spirit and scope thereof. Therefore, the exemplary embodiments described above should not be used to limit the scope of the invention.

What is claimed is:

1. An article of commerce comprising a paper product comprising a nonwoven sheet formed from a plurality of papermaking fibers and having first and second outer surfaces, wherein at least one outer surface comprises a topically applied binder composition at an add-on of at least 20% wt/wt to less than 50% wt/wt of the nonwoven sheet, the binder composition comprising at least about 5% wt/wt sublimable material, the sublimable material comprising at least one material selected from the group consisting of adamantine, endo-trimethylenenorbornane, cyclododecane, trimethylnorbornane, norbornane, naphthalene, camphor, menthol, dimethyl fumarate, benzoic acid, tri-oxymethylene, cumarin, α-dichlorobenzene, caprolactam, 1,4-cyclohexanediol, phthalide, lactide, triisopropyltrioxane; the article of commerce further comprising an air impermeable material overwrapping the paper product; wherein the sublimable material sublimes from the paper product in a time period of less than about 240 hours following separation of the air impermeable material from the paper product such that the paper product self-disintegrates.

2. The article of commerce of claim 1 wherein the sublimable material sublimes at room temperature.

3. The article of commerce of claim 1 wherein the sublimable material has a vapor pressure in the range of from about 0.01 to about 1.0 mmHg at 25° C.

4. The article of commerce of claim 1 wherein the sublimable material is cyclododecane.

5. The article of commerce of claim 1 wherein the sublimable material is menthol.

6. The article of commerce of claim 1 wherein the air impermeable material comprises a thermoplastic film.

7. The article of commerce of claim 1 wherein the air impermeable material comprises a basis weight from about 15 gsm to about 75 gsm.

8. The article of commerce of claim 1 wherein the air impermeable material comprises a thickness from about 300 microns to about 600 microns.

9. The article of commerce of claim 1, wherein the sublimable material sublimes from the paper product in a time period of less than about 120 hours.

10. A method of making the article of commerce of claim 1, the method comprising the steps of providing the plurality of papermaking fibers, forming the plurality of papermaking fibers into the nonwoven sheet comprising the first and the second outer surface, and applying to at least one of the outer surfaces of the nonwoven sheet the binder composition comprising at least about 5% wt/wt sublimable material at an add-on of at least 20% wt/wt of the nonwoven sheet.

11. The method of claim 10, wherein the step of applying the binder composition to at least one of the outer surfaces of the nonwoven sheet further includes the step of applying the sublimable material in a pattern that coats from about 75% to about 95% of the surface area of the outer surface of the nonwoven sheet to which the sublimable material is applied.

12. The article of commerce of claim 1, wherein the binder composition comprises less than about 40% wt/wt sublimable material.

* * * * *